(12) United States Patent
Klimasauskas

(10) Patent No.: US 6,246,972 B1
(45) Date of Patent: *Jun. 12, 2001

(54) ANALYZER FOR MODELING AND OPTIMIZING MAINTENANCE OPERATIONS

(75) Inventor: Casimir C. Klimasauskas, Sewickley, PA (US)

(73) Assignee: Aspen Technology, Inc., Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/321,145

(22) Filed: May 27, 1999

Related U.S. Application Data

(63) Continuation of application No. 08/702,148, filed on Aug. 23, 1996, now Pat. No. 6,110,214.

(51) Int. Cl.⁷ .................................................. G06F 19/00
(52) U.S. Cl. .................................. 703/2; 700/30; 700/31
(58) Field of Search .................................. 703/2; 700/28, 700/29, 30, 31, 48; 706/16, 45, 23; 376/215; 717/1; 702/123; 704/244; 714/799

(56) References Cited

U.S. PATENT DOCUMENTS

| | | | |
|---|---|---|---|
| 5,027,406 | 6/1991 | Roberts et al. | 704/244 |
| 5,079,690 | 1/1992 | Li | 700/48 |
| 5,111,531 | 5/1992 | Grayson et al. | 706/23 |
| 5,130,936 | 7/1992 | Sheppard et al. | 702/123 |
| 5,142,612 | 8/1992 | Skeirik | 706/23 |
| 5,159,660 | 10/1992 | Lu et al. | 706/23 |
| 5,311,562 | 5/1994 | Palusamy et al. | 376/215 |
| 5,386,373 | 1/1995 | Keeler et al. | 700/266 |
| 5,446,895 | 8/1995 | White et al. | 717/1 |
| 5,458,732 | 10/1995 | Butler et al. | 216/61 |
| 5,477,444 | 12/1995 | Bhat et al. | 700/48 |
| 5,680,409 | 10/1997 | Qin et al. | 714/799 |
| 5,691,895 | 11/1997 | Kurtzberg et al. | 700/29 |
| 5,710,700 | 1/1998 | Kurtzberg et al. | 700/29 |
| 5,727,128 | 3/1998 | Morrison | 706/45 |
| 5,771,179 | 6/1998 | White et al. | 1/1 |
| 5,796,606 | 8/1998 | Spring | 700/9 |
| 5,877,954 | * 3/1999 | Klimasauskas et al. | 700/29 |
| 6,110,214 | * 8/2000 | Klimasauskas | 703/2 |

OTHER PUBLICATIONS

Geladi, Paul, et al., "Partial Least–Squares Regression: A Tutorial", Analytica Chimica Acta, 185 (1986) pp. 1–17.

Serth, R. W., et al., "Gross Error Detection and Data Reconciliation in Steam–Metering Systems", A.I.Ch.E. Journal, May 1986, vol. 32, No. 5, pp. 733–742.

Serth, R. W., et al., "Detection of Gross Errors in Nonlinearly Constrained Data: A Case Study", Chem. Eng. Comm. 1987, vol. 51, pp. 89–104.

Moody, J., et al., "Learning with Localized Receptive Fields", Yale University Dept. of Computer Science, Sep. 1988, pp. 1–11.

(List continued on next page.)

Primary Examiner—Kevin J. Teska
Assistant Examiner—Russell W. Frejd
(74) Attorney, Agent, or Firm—Bracewell & Patterson, L.L.P.

(57) ABSTRACT

A first model or first analyzer having a series of filters is provided to represent time-varying effects of maintenance events. The first model or analyzer further enhances the selection of derived variables which are used as inputs to the first analyzer. Additionally, a combination of fuzzy logic and statistical regression analyzers are provided to better model the equipment and the maintenance process. An optimizer with a bi-modal optimization process which integrates discrete maintenance events with continuous process variables is also provided. The optimizer determines the time and the type of maintenance activities which are to be executed, as well as the extent to which the maintenance activities can be postponed by changing other process variables. Thus, potential modifications to process variables are determined to improve the current performance of the processing equipment as it drifts out of tolerance.

14 Claims, 10 Drawing Sheets

OTHER PUBLICATIONS

Wold, Svante, et al., "Nonlinear PLS Modeling", Chemometrics and Intelligent Laboratory Systems, 7 (1989), pp. 53–65.

Kramer, et al., "Diagnosis Using Backpropagation Neural Networks—Analysis and Criticism", Computers Chem. Engng., vol. 14, No. 2, 1990, pp. 1323–1338.

Helland, Kristian, et al., "Recursive algorithm for partial least squares regression", Chemometrics and Intelligent Laboratory Systems, 14 (1991), pp. 129–137.

Puskorius, G. V., et al., "Decoupled Extended Kalman Filter Training of Feedforward Layered Networks", IEEE, 1991, pp. I–771–I–777.

Kohonen, Teuvo, et al., LVQ PAK: A program package for the correct application of Learning Vector Quantization algorithms, IEEE, 1992, pp. I–725–I–730.

Plutowski, et al., "Selecting concise training sets from clean data", Feb. 1992, pp. 1–45.

Qin, S.J., et al., "Nonlinear PLS Modeling Using Neural Networks", Computers Chem. Engng., vol. 16, No. 4, 1992, pp. 379–391.

Su, Hong–Te, et al., "Integrating Neural Networks with First Principles Models of Dynamic Modeling", IFAC Symp. on DYCOR+, 1992, pp. 77–82.

Kramer, Mark A., et al., "Embedding Theoretical Models in Neural Networks", 1992 ACC/WA14, pp. 475–479.

Kramer, M.A., "Autoassociative Neural Networks", Computers Chem. Engng., vol. 16, No. 4, 1992, pp. 313–328.

Klimasauskas, C., "Developing a Multiple MACD Market Timing System", Advanced Technology for Developers, vol. 2, Special Issue, 4 Qtr. 1993, pp. 1–47.

Thompson, Michael L., et al., "Modeling Chemical Processes Using Prior Knowledge and Neural Networks", A.I.Ch.E. Journal, Aug. 1994, vol. 40, No. 8, pp. 1328–1340.

Haykin, Simon, "Neural Networks Expand SP's Horizons", IEEE Signal Processing Magazine, Mar. 1996, pp. 24–49.

Mulgrew, Bernard, "Applying Radial Basis Functions", IEEE Signal Processing Magazine, Mar. 1996, pp. 50–65.

Jain, Anik K., et al., Artificial Neural Networks: A Tutorial, Computer, Mar. 1996, vol. 29, No. 3, pp. 31–44.

Shang, Yi and Wah, Benjamin, "Global Optimization for Neural Network Training", Computer, Mar. 1996, vol. 29, No. 3, pp. 45–54.

Serbedzija, Nikola B., "Simulating Artificial Neural Networks on Parallel Architecture", Computer, Mar. 1996, vol. 29, No. 3, pp. 57–63.

Tan, Chew Lim, et al., "An Artificial Neural Network that Models Human Decision Making", Computer, Mar. 1996, vol. 29, No. 3, pp. 64–70.

Setiono, Rudy, et al., "Symbolic Representation of Neural Networks", Computer, Mar., 1996, vol. 29, No. 3, pp. 71–77.

Zhao, Hong, et al., "Modeling of Activated Sewage Wastewater Treatment Processes Using Integrated Neural Networks and a First Principle Model", IFAC, 13th World Congress, 1996, pp. 1–5.

Westinghouse Electric Corporation, Descriptive Bulletin 21–161, WDPFII System Overview, pp. 1–5.

Westinghouse Electric Corporation, Descriptive Bulletin 21–196, WDPFII WEStation Historian, pp. 1–4.

Westinghouse Electric Corporation, Descriptive Bulletin 21–188, WDPFII Distributed Processing Unit—Series 32, pp. 1–4.

Westinghouse Electric Corporation, Descriptive Bulletin 21–195, WEStation OpCon, pp. 1–4.

Westinghouse Electric Corporation, Descriptive Bulletin DB21–206, Standard Algorithms, pp. 1–8.

Westinghouse Electric Corporation, Descriptive Bulletin 21–189, WDPFII Westnet II Plus Data Highway, pp. 1–2.

Westinghouse Electric Corporation, Descriptive Bulletin 21–177, WDPFII Q–Line Process I/O, pp. 1–2.

White, David A., and Sofge, Donald A. (Ed.), Handbook of Intelligent Control, (pp. 283–356).

Farkow, Stanley J., Self–organizing methods in modeling "The GMDH Algorithm", (1984), pp. 1–24.

Collection of papers on Kernel Estimators and Adaptive Mixtures downloaded from http://irisd.nswc.navy.mil/AM/kernal.html.

Neuralware, Neural Computing—A Technology Handbook for Professional II/PLUS and Neuralworks Explorer (1993), pp. NC–171–181.

Berenji, Hamid R., et al., "Learning and Tuning Fuzzy Logic Controllers Through Reinforcements", IEEE Transactions on Neural Networks, vol. 3, No. 5, (Sep. 1992), pp. 724–740.

* cited by examiner

ANALYZER FOR MODELING AND OPTIMIZING MAINTENANCE OPERATIONS

This is a Continuation of Ser. No. 08/702,148, filed on Aug. 23, 1996, now U.S. Pat. No. 6,110,214.

BACKGROUND OF THE INVENTION

1. Field of the Invention

The present invention relates to a system for optimizing manufacturing processes, and particularly, to a system for modeling and optimizing the maintenance of semiconductor processing equipment.

2. Description of the Related Art

The electronics industry's growth during the twentieth century has been driven in part by a rapid succession of revolutionary improvements in the performance and reliability of the microelectronics, accompanied by drastic reductions in cost, power consumption and size of the resulting semiconductor devices. These advances are supported by corresponding improvements in semiconductor processing technology.

The production of semiconductor devices involves three essential steps: an integrated circuit (IC) design step, a mask making step and a fabrication step. The fabrication step maps the semiconductor structures generated by the design and mask making steps onto the silicon surface in specified layers. After the features of the IC are defined and implemented as components in the first step, as specified in design files, the second step includes the photolithography step which converts the design files into a set of masking plates containing exact images of the semiconductor structures in either opaque or transparent shades. After the creation of the masks, a "fab house" or a sophisticated chemical factory makes "prints" of the masks onto silicon wafers to create semiconductor structures on the IC.

One common type of equipment in the fab houses includes plasma etch reactors for removing of layers such as dielectric films for creating capacitors and other semiconductor structures. As is common in many complex manufacturing processes, long term drift occurs in the semiconductor manufacturing equipment, including the plasma etch reactors. This drift causes plant equipment to operate outside of the specified operating ranges, leading to undesirable manufacturing defects and, if not timely corrected, ultimately to equipment failures that could affect the integrity of the plant itself.

To compensate for long term drift, manufacturing personnel traditionally vary one or more continuous process variables. For plasma etch reactors, these variables included radio frequency (RF) power variables, pressure level variables, and gas flow variables, among is others. The plant personnel also correct drift using maintenance events such as replacing or cleaning various components of the reactors. Due to their complexity, the plasma etch reactors require a significant amount of maintenance which is expensive in terms of the maintenance labor cost, the cost of anticipatory component replacement, as well as the plant throughput reduction caused by maintenance events. As the alternative of a plant shut-down is unacceptable, the industry expends significant efforts in optimizing the equipment maintenance process.

The increasing complexity of industrial processes drove process control systems toward making experience-based judgments akin to human thinking in order to cope with unknown or unanticipated events affecting the maintenance of the plant equipment. The application of expert system technology represents a step in the adaptive control of this complex IC fabrication equipment. Based on the knowledge derived from one or more experts, the expert system software typically adjusts the process control strategy after receiving inputs on changes in the system environment and control tasks. However, as the expert system depends heavily on a complete transfer of the human expert's knowledge and experience into an electronic database, it is difficult to produce an expert system capable of handling all the dynamics of a complex system.

Recently, neural network based systems were developed with powerful self-learning and adaptation capabilities to cope with uncertainties and changes in the system environment. Modeled after biological neural networks, engineered neural networks process training data and formulate a matrix of coefficients representative of the firing thresholds of biological neural networks. The matrix of coefficients are derived by repetitively circulating data through the neural network in training sessions and adjusting the weights in the coefficient matrix until the outputs of the neural networks fall within predetermined ranges of the expected outputs of the training data. Thus, after training, a generic neural network conforms to the particular task assigned to the neural network. Thus, the neural network shares common traits with a large class of flexible functional form models known as non-parametric models, which include neural networks, Fourier series, smoothing splines, and kernel estimators.

Although a neural network-based maintenance modeling system has powerful self-leaning and adaptation capabilities to cope with uncertainties and changes in its environment, the lack of a process-based internal structure represents a liability for the neural network. For instance, when training data are limited and noisy, the network outputs might not conform to known process constraints. For example, certain process variables increase monotonically as they approached their respective asymptotic limits. Both the monotonicity and the asymptotic limits constitute factors that should be enforced on the neural network when modeling these variables. However, the lack of training data may have prevented a neural network from capturing either.

In such events, insufficient data hampers the accuracy of a neural network due to the network's pure reliance on training data when inducing process behavior. A number of approaches have been utilized to exploit prior known information and to reduce the dependence on the training data alone, including the use of qualitative knowledge of a function to be modeled to overcome the sparsity of training data. One approach deploys a semi-parametric design which applies a parametric model in tandem with the neural network. As described by S. J. Qin and T. J. McAvoy in "Nonlinear PLS Modeling Using Neural Networks", *Computers Chem. Engng.*, Vol. 16, No. 4, pp. 379–391 (1992), a parametric model with a fixed structure is derived from a first principle which can be existing empirical correlations or known mathematical transformations. The neural network is used in a series approach to estimate intermediate variables to be used in the parametric model.

Alternatively, a parallel semi-parametric approach has been deployed where the outputs of the neural network and the parametric model are combined to determine the total model output. The model serves as an idealized estimator of the process or a best guess at the process model. The neural network is trained on the residual between the data and the parametric model to compensate for uncertainties that arise from the inherent process complexity.

Although the parallel semi-parametric model provides a more accurate model than either the parametric model or the neural network model alone, it requires prior knowledge, as embodied in the first principle in the form of a set of equations based on known physics or correlations of input data to outputs. The parametric model is not practical in a number of instances where the knowledge embodied in the first principle is not known or not available. In these instances, a readily adaptable framework is required to assist process engineers in creating a process model without advance knowledge of factors such as the first principle. First principle models of long-term drift from maintenance effects in IC fabrication equipment are difficult to construct. Moreover, the theory upon which the models are based is incomplete at best. Thus, they do not effectively model the events that trigger signals indicating that maintenance was needed on the IC fabrication equipment.

A second approach to modeling maintenance is to uniformly sample events back in ime and use these as inputs to a regression model. Such periodic sampling of events back in time is appropriate only for systems which sample data at regular intervals. However, plasma etching equipment collects maintenance event data only sporadically, typically as a result of a production change or a system failure/degradation.

A third approach is to use the time since the last maintenance event as a direct input to a model. This fails to effectively capture the observed non-linearity of the maintenance effects over time for the plasma etching equipment.

SUMMARY OF THE INVENTION

The present invention provides a first model or first analyzer having a series of filters to represent time-varying effects of maintenance events. The first model or analyzer further enhances the selection of derived variables which are used as inputs to the first analyzer. Additionally, a combination of fuzzy logic and statistical regression analyzers are provided to better model the equipment maintenance process. The present invention also provides an optimizer with a bi-modal optimization process which integrates discrete maintenance events is with continuous process variables. The optimizer determines the type of maintenance activities which are to be executed, as well as the extent to which the maintenance activities can be postponed by changing other process variables. Thus, the present invention also determines potential modifications to process variables to improve the current performance of the processing equipment as it drifts out of tolerance.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
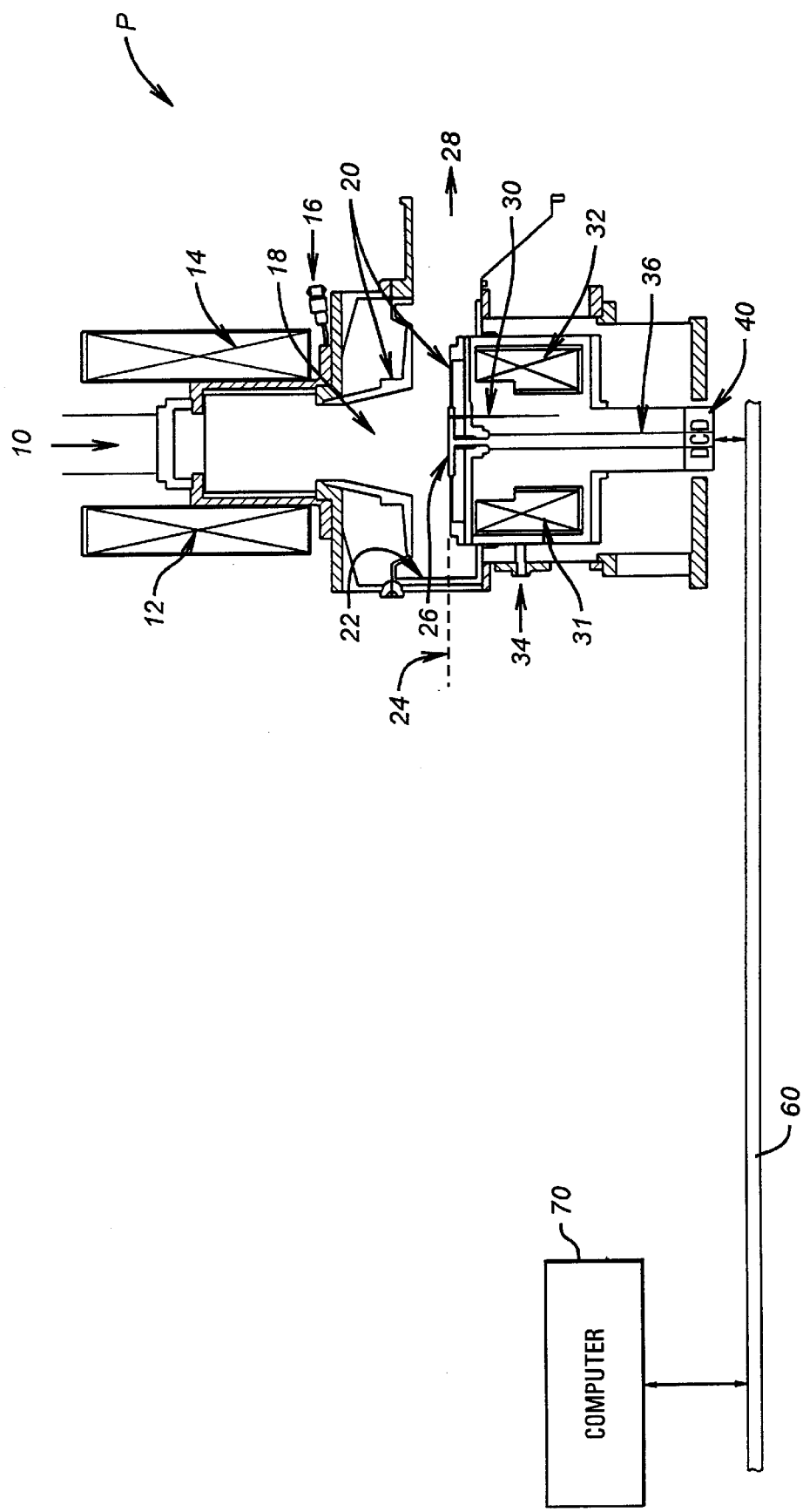
FIG. 1 is a block diagram of a plasma etching system controlled by the control system according to the present invention.

FIG. 1 illustrates a block diagram of an illustrative semiconductor manufacturing equipment and a control system for monitoring and maintaining the equipment. A plasma etch reactor P of FIG. 1 is provided to etch various semiconductor structures onto one or more silicon wafers. The reactor P is commercially available, and one commercial supplier of the reactor P is Lam Research Corporation.

In the reactor P, a microwave power source (not shown) provides microwave power to a waveguide 10 which beams microwave power to the top of a plasma chamber 18. In the plasma etching equipment P, a left ECL magnet 12 and a right ECL magnet 14 surrounds the plasma process chamber 18 to generate a magnetic field to control the ion bombardment. Further, a gas inlet 16 is provided to receive gases, including $NO_2$, $O_2$, and diluent gases such as argon into the chamber 18. Typically, silane for $SiO_2$ is introduced downstream in the chamber 18 to avoid unwanted silicon deposits. The field from magnets 12 and 14, along with the field-shaping magnetics below a wafer or substrate 26, helps in extracting and directing oxygen ions to the surface of the wafer where they react with silane.

The plasma etching equipment P has one or more temperature-controlled horns and targets 20. Further, the plasma process chamber 18 has replaceable chamber liners 22 lining a bottom side of the plasma process chamber 18. Opposite to the replaceable chamber liner 22 is a vacuum chamber 28 for drawing gases from the plasma process chamber 18. Further, in the plasma etching equipment P, a process positioner 24 is provided to receive the silicon wafer 26 or substrate for subsequent plasma etching. The wafer 26 is supported atop a piston 36. A wafer temperature probe 30 is placed adjacent to the wafer 26 on top of the positioner 24 to sense the temperature and to adjust the processing conditions as necessary. Further, a wafer load position adjustment unit 34 is provided to move the wafer 26 up or down as required. Additionally, bottom left and right field shaping auxiliary magnetics 31 and 32 are provided to shape the magnetic fields to effect the plasma etch pattern. The higher RF bias on the substrate leads to higher energy ion bombardment and consequent sputter etching of the deposited film. Hence, simultaneous etching and deposition processes occur, resulting in a characteristic film surface profile.

Finally, the plasma etching equipment P is controlled by electronics housed in a data collection device (DCD) 40 which collects and monitors information relating to the process parameters within the plasma etching equipment P. The DCD 40 communicates with a plant computer 70 via a plant local area network 60. The DCD 40 has a plurality of sensors and actuators placed strategically along the equipment P to collect data and to effect changes which are generated by a plant operator or by automatic software control on the computer 70.

The computer 70 is preferably a high performance workstation such as a Digital Equipment Corporation Alpha workstation, a Sun Microsystems SPARC workstation, or a high performance personal computer such as a Pentium-Pro based IBM compatible personal computer. Further, the computer 70 may be a single-board computer with a basic operating system such as the board in the WDPF II DPU Series 32, available from Westinghouse Corporation. Each of the computer 70 and the DCD 40 may operate the analyzer of the present invention alone. Alternatively, the CPUs in the computer 70 and the DCD 40 may operate as distributed processors to contribute to the real-time operation of the analyzer of the present invention.

Figure 2:
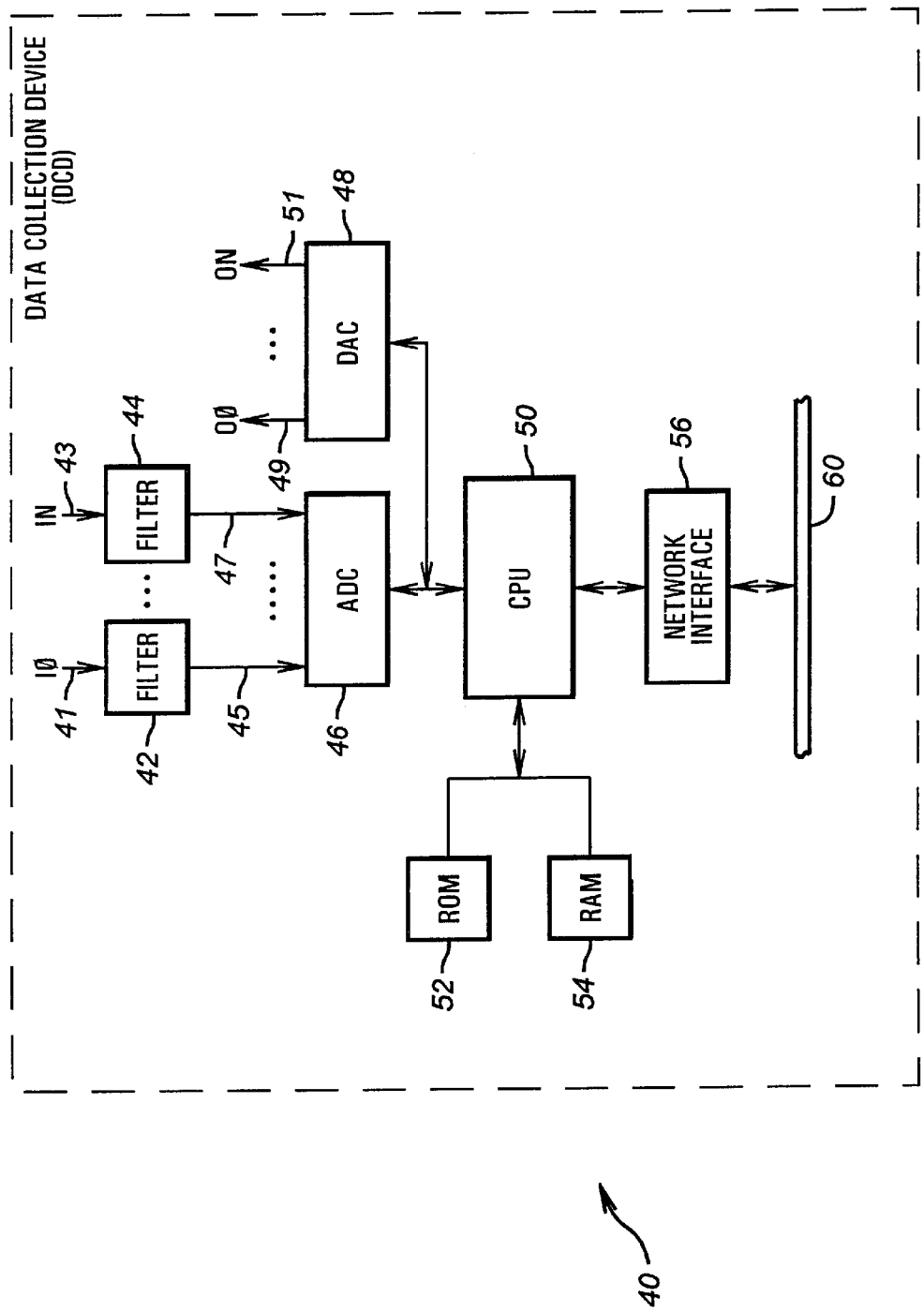
FIG. 2 is a block diagram showing a data collection device in the plasma etching equipment of FIG. 1.

Turning now to FIG. 2, the data collection device or DCD 40 is shown in more detail. In FIG. 2, the data collection device receives a plurality of inputs $I_0 \ldots I_N$ N from the plasma etching equipment P. Further, the data collection device 40 generates a number of outputs $O_0 \ldots O_N$ which are provided to instruments and actuators on the plasma etching equipment P to effect process changes. The input $I_0$ 41 is provided to a filter 42. Similarly, the input $I_N$ 43 is provided to a filter 44. The output of the filter 42 is a conditioned signal 45. Similarly, the output of the filter 44 is a conditioned signal 47. The conditioned signals 45 and 47 are provided to an analog to digital converter (ADC) 46 which converts the conditioned signals 45 and 47 into suitable digital signals for processing and storing by a central processing unit (CPU) 50.

The CPU 50 also drives a digital to analog converter (DAC) 48 which generates a plurality of analog outputs $O_0$ 47 through $O_N$ 51. The CPU 50 is further connected to a ROM 52 and a RAM 54. The ROM 52 contains nonvolatile instructions for the CPU 50 to execute.

These instructions include commands to the CPU 50 to acquire data generated by the instruments on the plasma etching equipment P as well as generating local control signals to the instruments on the plasma etching equipment P to effect process changes. The CPU 50 is also connected to a network interface 56 which eventually connects to the factory local area network 60 to communicate information such as statistical parameters as well as to receive commands from the computer 70 from the plant operator or control software running on the computer 70.

Figure 3:
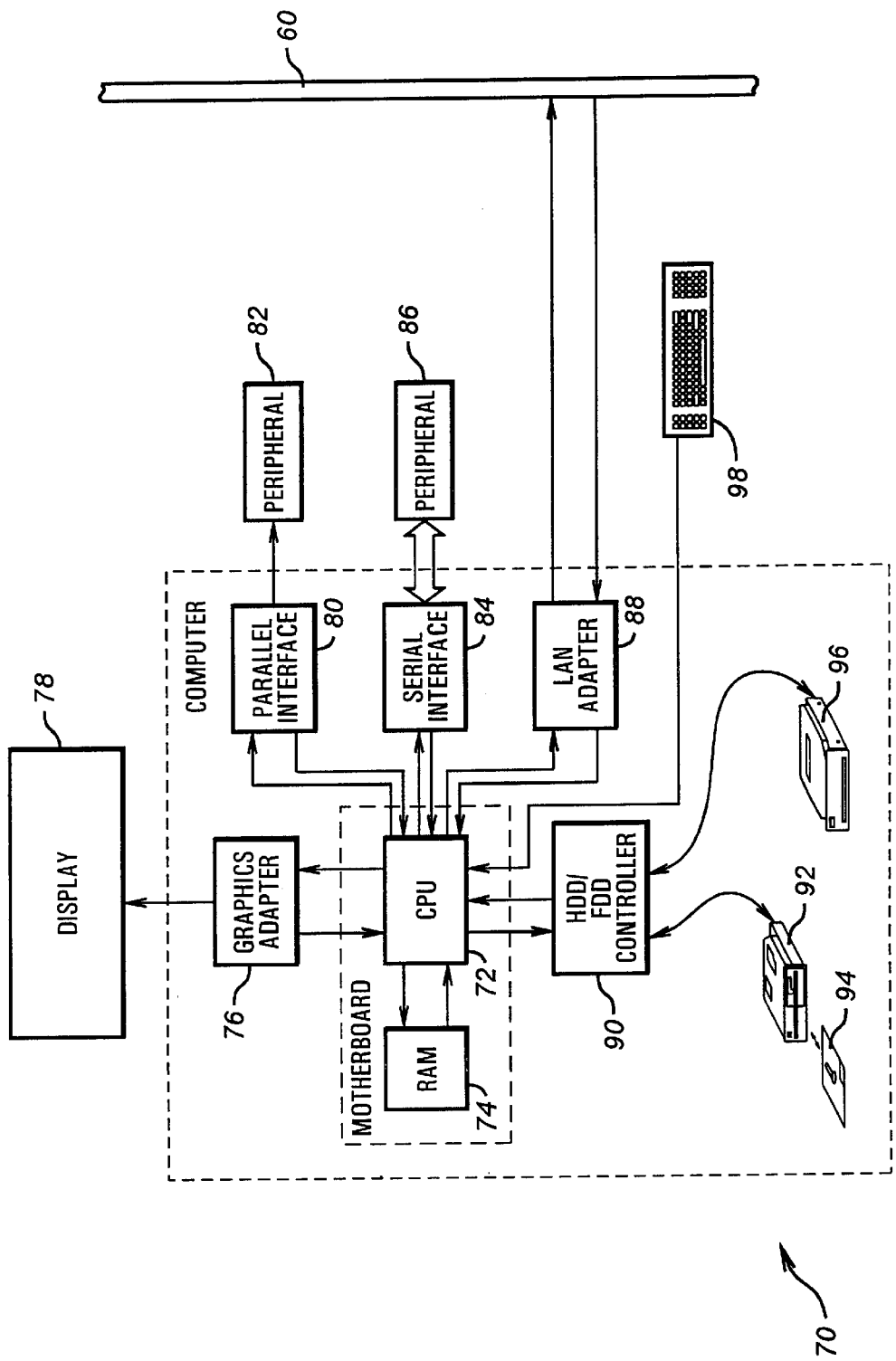
FIG. 3 is a block diagram showing the computer control system of FIG. 1.

Turning now to FIG. 3, a block diagram of the computer 70 is shown in more detail. In FIG. 3, a second CPU 72 is shown connected to a random access memory (RAM) 74. Further, the CPU 72 is connected to a graphics adapter 76. The graphics adapter 76 drives a display 78 to provide visual feedback to the plant operator. Further, the CPU 72 is connected to a parallel interface 80, a serial interface 84, and a local area network (LAN) adapter 88. The parallel interface 80 is in turn connected to one or more peripherals 82 which accept parallel inputs. Similarly, the serial interface 84 is connected to one or more serial peripherals 86 such as a modem and a mouse. The LAN adapter 88 is connected to the plant local area network 60 to communicate with the data collection device 40, among others.

As shown in FIG. 2, the CPU 72 is also connected to a keyboard 98 for receiving typed data entries and/or commands from the plant operator. Finally, the CPU 72 is also connected to a hard disk/floppy disk controller 90. The controller 90 is in turn connected to a floppy disk drive 92 for receiving a floppy disk 94. Further, the controller 90 is connected to a large capacity, high speed data storage device 96, including a hard disk drive or an archival data storage device such as an optical disk drive.

In FIG. 3, the computer 70 can be configured to store historical data acquired by the DCD 40 into a data file on the disk drive 96 and further to execute the analyzer process of the present invention for maintenance purposes. The output values generated by the analyzer on the factory computer 70 are provided to the DCD 40 over the network 60. The computer 70 can also send the necessary control commands over the network 60 to one or more instruments such as valve controllers (not shown) to turn on and off the valves appropriately to cause various process changes. Alternatively, the DCD 40 can store the historical data file on its RAM 54 or on an internal disk drive and further execute the analyzer of the present invention in a stand-alone mode. Collectively, the computer 70 with the disks 92 and 96 and various sensors and output drivers form a distributed control system (DCS), as is known in the art.

Figure 4:
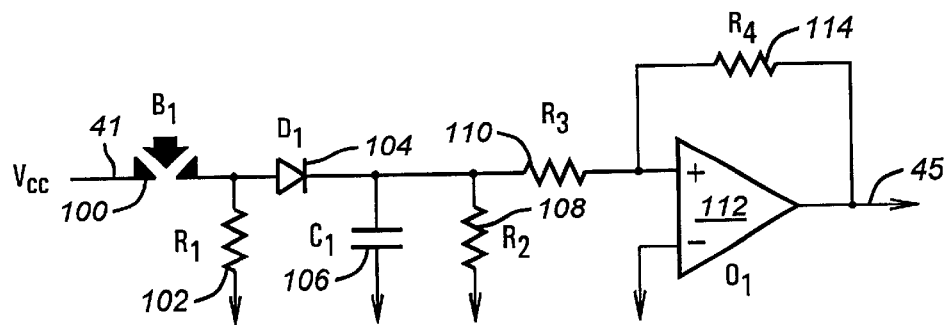
FIG. 4 is a schematic illustration of a filter of FIG. 2.

Turning now to FIG. 4, a representative circuit for each of filters 42 and 44 is shown. In FIG. 4, a voltage input 41 is provided to one input of a push-button 100. The voltage 41 is typically fixed at a specific value. A resistor 102 is connected at one end to the other input of the push-button 100. The second end of the resistor 102 is grounded. A diode 104 is also connected to the second end of the push-button 100. Further, a capacitor 106 is connected to the other end of the diode 104.

A plurality of resistors 108 and 110 are connected to a first end of the capacitor 106. The second ends of the capacitor 106 and the resistor 108 are grounded. The second end of the resistor 110 is provided to a positive input of an operational amplifier 112. The negative input of the operational amplifier 112 is grounded. The output of the operational amplifier 112 is connected to one end of a resistor 114, while the other end of the resistor 114 is connected to the positive input of the operational amplifier 112. The output of the operational amplifier 112 is an output 45.

During the maintenance of the reactor sensor or instrument, the operator depresses the push-button 100 momentarily. This action causes the diode 104 to conduct rapidly, thus charging the capacitor 106 to a voltage equal to the input voltage 41, less the voltage drop across the diode 104. When the push-button 100 is released, the resistor 102 takes the input of the diode 104 to ground. At this point, the output of the diode 104 has a positive voltage. Thus, the diode 104 ceases to conduct electricity.

Next, the capacitor 106 begins to discharge, primarily through the resistor 108. Preferably, the resistor 110 is selected such that it has a resistance or an ohmage at least ten (10) times the ohmage of the resistor 108. In combination, resistors 110 and 114 and the operational amplifier 112 read out the voltage across the capacitor 106 with a minimum interference to the voltage dynamics. Preferably, the resistor 110 has an ohmage which equals the resistor 114, which is about twenty times the resistance value of the resistor 108. Thus, such resistance causes the operational amplifier to operate as a unity gain, high impedance amplifier for the voltage across the capacitor 106.

Figure 5:
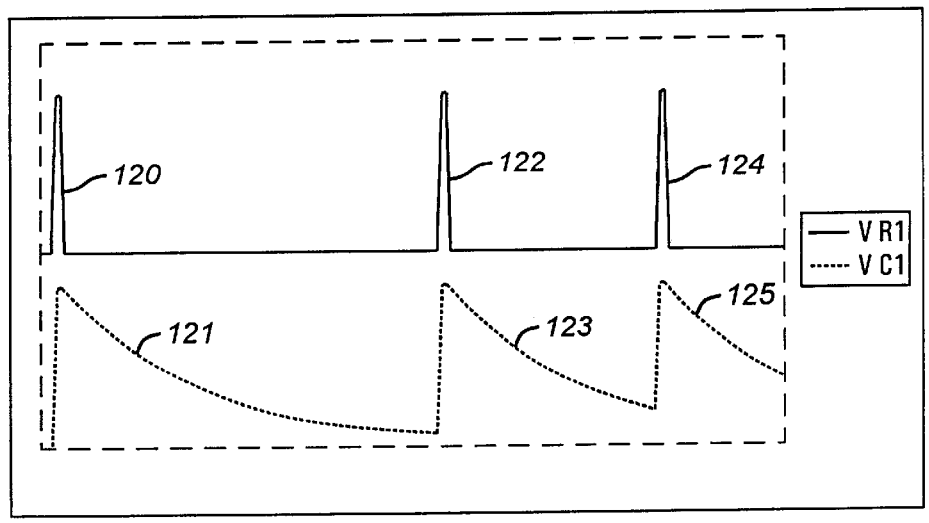
FIG. 5 is a waveform plot illustrating the operation of the filter of FIG. 4.

The voltage across the capacitor 106 is further shown in the voltage diagram of FIG. 5. FIG. 5 shows a plurality of spikes 120, 122, and 124 which represent the voltage across the resistor 102. The spikes 120, 122 and 124 are representative of three separate maintenance events occurring at points A, B and C where the push-button 100 is momentarily depressed and released. In FIG. 5, a plurality of exponentially decreasing curves 121, 123, and 125 show the voltage across capacitor 106 associated with each of spikes 120, 122, and 124. The spikes 121, 123 and 125 represent the responses of the filter of FIG. 4 when the push-button 100 is actuated in connection with maintenance events.

The voltages of the response curves 121, 123, and 125 of FIG. 5 follow an exponentially decreasing equation wherein $V(t)=V_0 e^{-t/K}$. In this equation, the time constant K equals $R2*C1$, provided that R3 is additionally at least ten times larger than R2. Additionally, $V_0$ is the voltage across the capacitor 106 at the instant the push-button 100 was released. Further, t is the time in radio frequency (RF) minutes, or the duration of microwave operation since the last push-button actuation, as it represents the operating time of the equipment P since the most recent maintenance event.

Preferably, the filter 42 of FIG. 4 is implemented in software using the above described equation. In the software, $V_0$ is preferably set to represent 1.0 volt whenever a particular maintenance event occurs. A single filter 42 of the type described in FIGS. 4 and 5 essentially maps the maintenance event into decay type time series. The model developed in the computer in accordance with the present invention then fits the empirical observation that maintenance events have a maximum initial impact on various control variables. The impact decreases over time, more rapidly at first and then more gradually, according to an exponentially decreasing function. However, a single filter 42 may not capture these phenomena as effectively as necessary to model the process. Thus, the present invention contemplates that several filters 42 can be used as input to the model, each with a different time constant K. Thus, by taking various linear combinations of the filter output values, historical data can be used to synthesize a variety of non-linear, time dependent responses of the system to specific maintenance events or combinations of maintenance events.

The time constants K for each of the filter 42 is selected heuristically in conjunction with the modeling process. One time constant is the time that it takes for the filter 42 to decay to 37% of its value, or $e^{-1}$. In three time constants, the filter 42 decays to 5% of its value, or $e^{-3}$. Thus, the longest time constant should be set to the expected maintenance interval. The next time constant should be set to one-half of that, and each succeeding time interval equals to one-half of the prior interval. Thus, for a particular maintenance activity, if the expected maintenance interval is 3,000 RF minutes, the longest time constant should be set at 3,000 minutes. The next event should be set to 1,500 RF minutes, while the subsequent event should be set for 750 and 350 RF minutes, respectively. Further, these values may be adjusted depending on the performance of the model.

Figure 6:
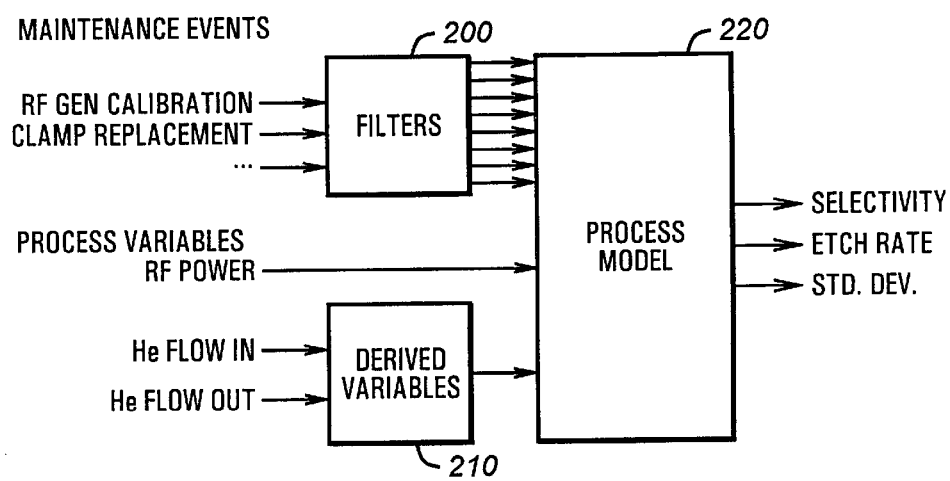
FIG. 6 is a block diagram illustrating an analyzer of the present invention for optimizing equipment maintenance.

Turning now to FIG. 6, the analyzer for optimizing the equipment maintenance process is shown in more detail. In FIG. 6, a bank with a plurality of filters 200, each of which is of the type disclosed in FIGS. 4 and 5, are provided. The filters, as indicated in the bank 200, receive various input data values, including a RF generator calibration input and a clamp replacement input, among others. The output of the filters 200 is provided to a process model 220. Further, process variables such as the RF generator power are provided to the process model 220. These process variables are collected by input sensors, probes and instruments placed on the plasma etching equipment P, as set forth above.

Additionally, data inputs such as gas flow input and output data, including the helium or other gas flow input and output values, are provided to a derived variable generator 210. The output of the derived variable generator 210 is provided to the process model 220 of FIG. 6. Based on the outputs of the filter 200, the process variables, and the output of the derived variable generator 210, the process model 220 generates outputs to predict key process variables. This model is used to optimize the plasma etching equipment P by adjusting one or more of its process control parameters.

Referring now to the derived variable generated by the generator 210, the derived generator 210 simplifies the problem and enhances the performance of the process model 220. The derived variable generator 210 essentially transforms various measurements such as the gas flow into forms that better represent events occurring in the process. For continuous process variables, the derived variable generator 210 tests the potential of several candidate formulas. The derived variable generator 210 then applies various linear correlations to rank candidate formulas. When the derived variable generator 210 discovers strong correlations, these correlated variables are utilized to enhance the performance of the process model 220. For example, it may take the difference of gas inflow and outflow to yield a net gas flow.

Figure 7:
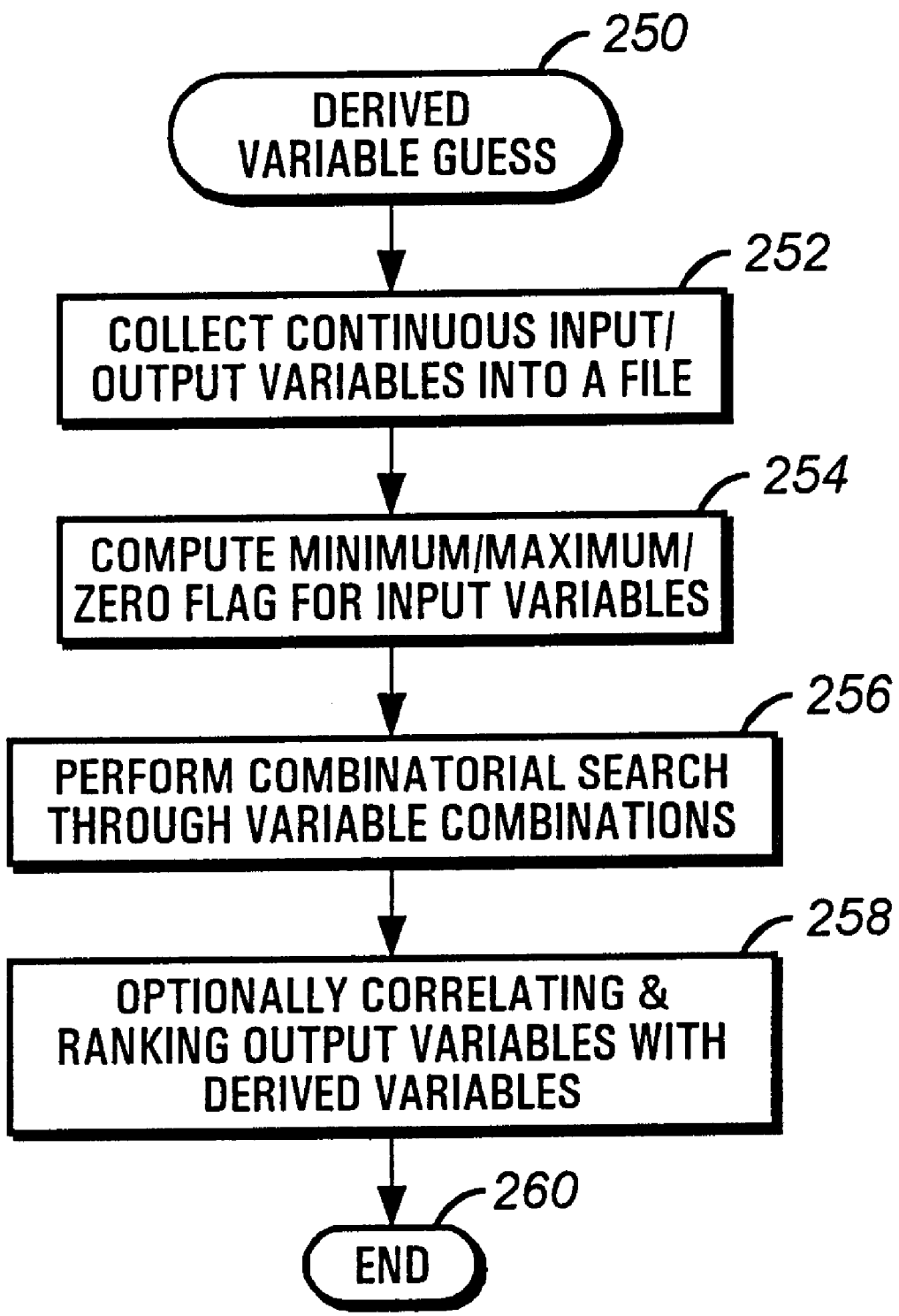
FIG. 7 is a flow chart illustrating a derived variable guess process in accordance with the present invention.

In addition to the use of expert knowledge and empirical data in constructing the derived variables, the present invention also contemplates that an optional heuristic technique can be used to "guess", or to systematically arrive in the manner described at potentially good derived variables satisfying predetermined optimization constraints using heuristic determinations. To the extent that better data are selected as derived variables, the resulting process model 220 will be simpler and quicker in its operation. Turning now to FIG. 7, a flow chart of a process for guessing at good derived variables is disclosed in more detail. Starting from step 250, a derived variable guess routine collects continuous input and output variables into a data file in step 252. The data file may reside on the disk drive 96. Alternatively, the input and output variables may be stored in a memory array on the RAM 74 or may be extracted by on-the-fly processing procedures.

From step 252, the process of FIG. 7 proceeds to step 254 where it computes a minimum value and a maximum value for each input variable. Further, in step 252, the process sets or clears a flag indicating that the input variable has a value of zero. Step 252 is repeated for each input variable. From step 252, the routine of FIG. 7 proceeds to step 256 where it performs a combinatorial search through all possible combinations of two input variables and each possible combination of operators generating the derived variables as follows:

$Vd(i,j)=X_i-X_j$, $i \neq j$ $Vp(i,j)=X_i*X_j$ $Vq(i,j)=X_i/X_j$, $i \neq j$, and $X_j \neq 0$ where $X_i$, $X_j$ are input process variables (MVs and DVs) and not maintenance events.

The linear correlation coefficient for each of these derived variables is computed with respect to each of the output variables. Each possible transformation is ranked in terms of the absolute value of linear correlation coefficient, those with the highest ranking considered the best candidates. In step 258, the top N candidates (N selected by the user, typically 3–5 per output) are included as part of the derived variables. When more than one output variable, each transform is ranked against each output variable, and separate lists maintained for each. The final top N candidates are selected equally distributed across the lists for each of the outputs.

In step 256, the linear correlation, preferably Pearson's R coefficient, is computed using the following formula:

$$R = \frac{\sum (x - \bar{x})(y - \bar{y})}{\sqrt{\sum (x - \bar{x})^2 \sum (y - \bar{y})^2}}$$

where x—one variable to compare (such as the value of the derived variable), y—the second variable to compare (such as the value of the output), R—the correlation between x and y;

$\bar{x}$=averaged x values; and $\bar{y}$=averaged y values.

In step 256, the following transformations may also be tested by computing their correlations with the dependent (output) variables and ranking them along with the above potential derived variables in accordance with the following equations:

$Vdp(i,j,k)=Vd(i,j)*X_k, i \neq j$ $Vpp(i,j,k)=Vp(i,j)*X_k$ $Vqp(i,j,k)=Vq(i,j)*X_k, j \neq k, i \neq j,$ and $X_j \neq 0$ $Vdq(i,j,k)=Vd(i,j)/X_k, i \neq j,$ and $X_k \neq 0$ $Vpq(i,j,k)=Vp(i,j)/X_k, i \neq k, j \neq k,$ and $X_k \neq$ $Vqq(i,j,k)=Vq(i,j)/X_k, i \neq j, i \neq k,$ and $X_{j,k} \neq 0$ where: $X_k$ is an input process variable (MVs and DVs), but not a maintenance event.

For an efficient implementation, the results of a single transformation are preferably computed, and correlation between that and each of the output variables computed. Lists of transformations are limited to the maximum number of transforms which will be selected. For example, Vd(1,2), or the difference of process variables 1 and 2, may be computed for all of the data examples. The correlation between this and the output is computed. If this result is higher in magnitude than the lowest element on the list, it is added to the list for this output. Otherwise, it is discarded. Next, Vp(1,2) is computed and the results written over those for the prior transformation. The correlation is computed. If this is higher in magnitude than the lowest element on the list, it is added to the list and the lowest element dropped.

Two approaches have been taken to speed up the process of selecting candidate transformations for derived variables. The first is to observe that if the correlation on a uniformly distributed small sub-set is small, the correlation on the entire data set will likely be small as well. Selecting a small sub-set of data which uniformly covers the outcomes, and testing on that as a "pre-screening" can substantially reduce the amount of computation required. The sub-set is selected by dividing the range of each of the outputs into a predetermined number of bins. Then the same number of examples are selected from each bin. Alternatively, the present invention contemplates the application of a genetic algorithm, as known to those skilled in the art, to "intelligently" search the space.

These specific transformations were selected, because they are the kinds of relationships typically found in modeling physical processes. Derived variable transformations computed in this way are used in place of or to augment derived variables constructed by the process engineer.

Although this technique is applicable to the process of modeling the plasma etch equipment for maintenance purposes, the technique is applicable to a number of applications, including the generation of Derived Variables such as those discussed in a commonly assigned U.S. application Ser. No. 08/642,775 entitled "HYBRID LINEAR-NEURAL NETWORK PROCESS CONTROL", filed on May 3, 1996 and hereby incorporated by reference.

Once the input data have been transformed and derived variables have been generated, a data file consisting of transformed input data and corresponding measured output data is constructed. This data file is used to create the process model 220. Turning now to the process model 220, a number of approaches can be used to model the plasma etch process. Although a linear regression solution is simple to implement, it has been found to be inadequate to capture the non-linear aspects of the process. More complex techniques include polynomial regression (fixed formula), Group Method Data Handling (a constructive algorithm for polynomial regression), and a neural network back-propagation algorithm. Although the back-propagation solution using a variation of Fahlman's cascade correlation algorithm can capture the non-linear dynamics of the plasma etching process, the neural network's inability to handle sparse training data is not desirable in certain applications. In the preferred embodiment, a combined analyzer having a primary analyzer with a fuzzy logic analyzer is utilized, as described in FIG. 8. The combined analyzer, also called a fuzzy PLS analyzer or model, deploys a fuzzy logic estimator to map the data space from T to U.

Figure 8:
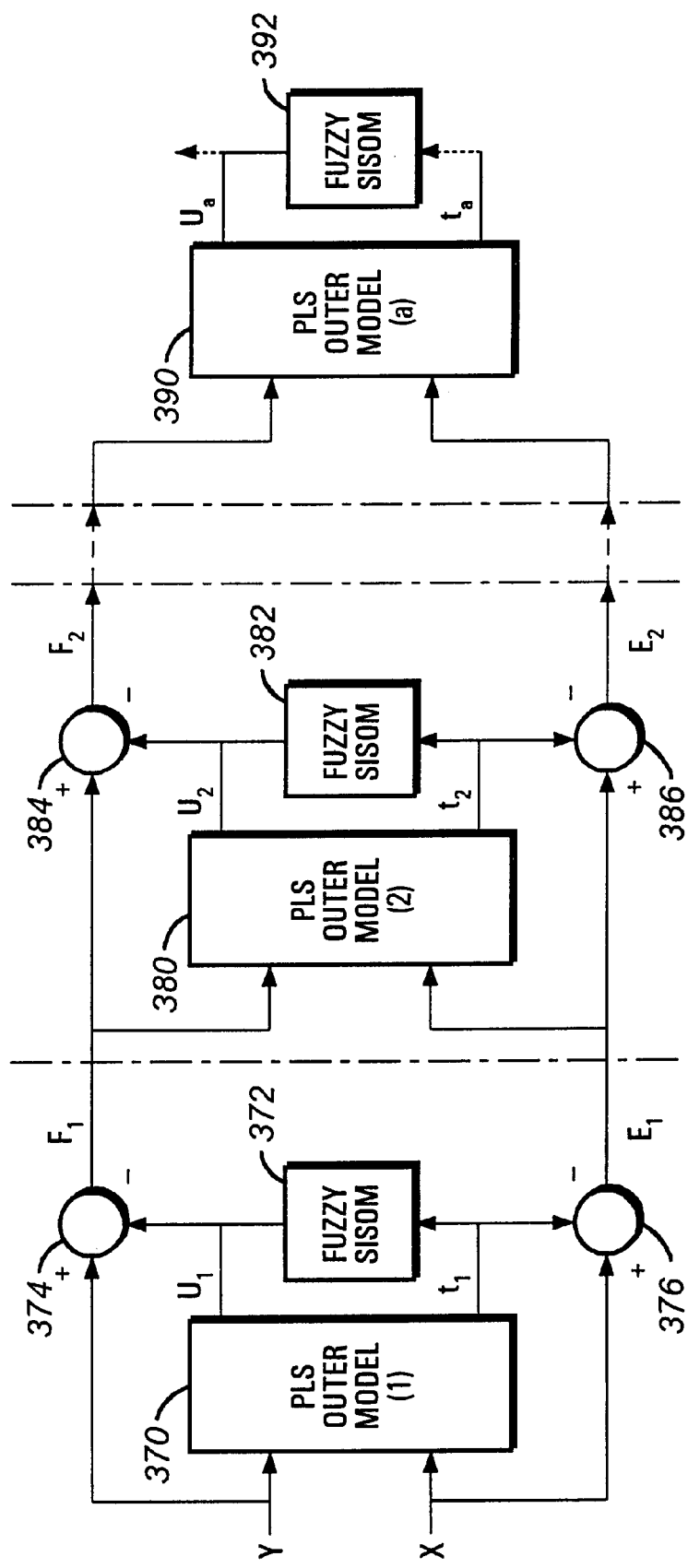
FIG. 8 is a block diagram of a fuzzy PLS analyzer in accordance with the present invention.

FIG. 8 shows the fuzzy partial least squares (fuzzy PLS) analyzer or model of the present invention. In FIG. 8, data are processed by a number of primary analyzers or PLS outer transforms 370, 380 and 390. These transforms decompose a multivariate regression problem into a number of univariate regressors. Each regressor is implemented by a small fuzzy single input single output model or analyzer in this method. The fuzzy analyzer has no local minima or other ill-conditioning problems.

Turning now to FIG. 8, the schematic illustration of the fuzzy PLS model or analyzer is shown in more detail. In FIG. 8, a primary analyzer, which in this case is a PLS outer analyzer or model 370, is used in conjunction with a fuzzy Single Input Single Output Model (SISOM) 372 for solving the first factor. Thus, in the combination of the PLS 370 S and the fuzzy SISOM 372, the PLS outer analyzer or model 370 generates score variables from X and Y data matrices. The scores are used to construct the fuzzy SISOM 372. The output of the fuzzy SISOM 372 is applied to the respective variables X and Y using the summing devices 376 and 374 respectively. The outputs from the summer 374, $F_1$, and 376, $E_1$, are provided into the next stage for solving the second factor solution. The outputs of the first PLS outer model 370 and the SISOM 372, $F_1$ and $E_1$, are provided to a second combination including second primary analyzer, in this case a PLS outer model 380, and a second fuzzy SISOM 382. The PLS outer model 380 receives $F_1$ and $E_1$ as inputs. The output from the PLS outer model 380 are provided to train the fuzzy SISOM 382. Further, the outputs of the fuzzy SISOM 382 are provided to summers 384 and 386 to generate outputs $F_2$ and $E_2$, respectively. Analogously, a number of additional identical stages can be cascaded to extend the analyzer of FIG. 8. At the last stage of FIG. 8, the output from the summers generating $F_j$ and $E_i$ are provided to a final primary analyzer, in this case a PLS outer model 390, whose outputs are used to train a final fuzzy SISOM 392.

As shown, in each stage of the fuzzy PLS of FIG. 8, original data are projected factor by factor to latent variables by outer PLS models before they are presented to fuzzy SISOMs which learn the inner relations. Using such plurality of stages, only one fuzzy SISOM is trained at a time, simplifying and reducing the training times and storage space conventionally associated with a multidimensional fuzzy rule base. Further, the fuzzy SISOM as described has no local minima in the solution space.

In Chemometrics, partial least squares (PLS) regression has become an established tool for modeling linear relations between multivariate measurements. As described in Paul Geladi and Bruce R. Kowalski, "Partial Least-Squares Regression: A Tutorial", *Analytica Chimica Acta*, Vol. 185, pp. 1–17 (1986), the PLS approach typically uses a linear regression model which relates the model inputs to the outputs through a set of latent variables. These latent variables are calculated iteratively and they are orthogonal to each other. As a result, compared to other linear regression models, the PLS model works well for the cases where input variables are correlated and the data are sparse.

In the PLS model, the regression method compresses the predicted data matrix that contains the value of the predictors for a particular number of samples into a set of latent variable or factor scores. By running a calibration on one set of data (the calibration set), a regression model is made that is later used for prediction on all subsequent data samples. To perform the PLS regression, input and output data are formulated as data matrices X and Y respectively:

$$X = \begin{bmatrix} X_{11} & X_{12} & \cdots & X_{1m} \\ X_{21} & X_{22} & \cdots & X_{2m} \\ \vdots & \vdots & \ddots & \vdots \\ X_{N1} & X_{N2} & \cdots & X_{Nm} \end{bmatrix};$$

$$Y = \begin{bmatrix} y_{11} & y_{12} & \cdots & y_{1p} \\ y_{21} & y_{22} & \cdots & y_{2p} \\ \vdots & \vdots & \ddots & \vdots \\ y_{N1} & y_{N2} & \cdots & y_{Np} \end{bmatrix}$$

where each row is composed of one set of observations and N is the number of sets of observations. The PLS model is built on a basis of data transformation and decomposition through latent variables. The input data block X is decomposed as a sum of bilinear products of two vectors, $t_h$ and $p'_h$, in addition to a residual matrix E:

$$X = \sum_{h=1}^{r} t_h p'_h + E = TP' + E$$

where P' is made up of the p' as rows and T of the t as columns. Similarly, the output data block Y is composed as $$Y = \sum_{h=1}^{r} u_h q'_h + F = UQ' + F$$

where Q' is made up of the q' as rows and U of the u as columns, in addition to a residual matrix F. Further, $t_h$ and $u_h$ are called score vectors of the h-th factor, $p_h$ and $q_h$ are called loading vectors corresponding to these factors. These vectors are computed such that the residual matrices E and F are minimized.

The PLS model builds a simplified regression model between the scores T and U via an inner relation:

$$u_h = b_h t_h + e$$

where $b_h$ is a coefficient which is determined by minimizing the residual e. Under that case, the regression model is $$Y' = x'W(P'W)^{-1}B\ Q'$$

where W is a weighting matrix used to create orthogonal scores and B is a diagonal matrix containing the regression coefficients $b_h$.

Figure 9:
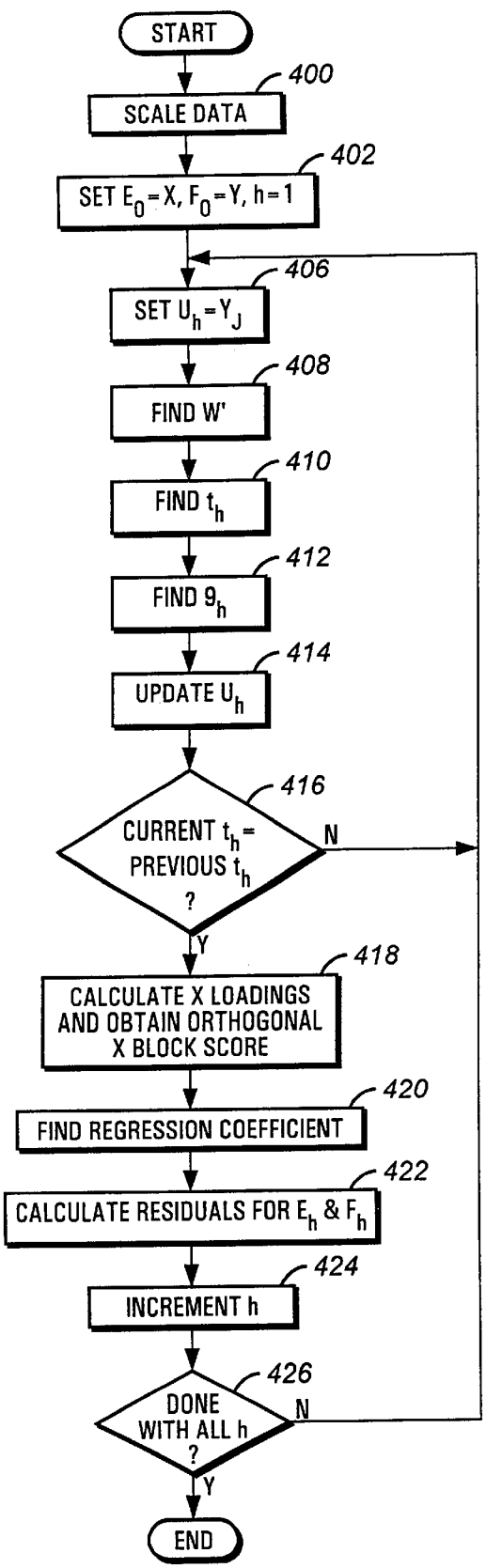
FIG. 9 is a flow chart illustrating a process for training a PLS model of FIG. 8.

Turning now to FIG. 9, the routine to train or develop the PLS primary analyzer or model 370, 380 or 390 is disclosed. In step 400, the input variables are scaled such that the input data X and the output data Y are preferably mean-centered and fitted into a unit-variance as follows:

$$X_{ij} = (X_{ij} - \overline{X}_j)/S_j^x$$

where $$\overline{X} = [\overline{X}_1, \overline{X}_2, \ldots, \overline{X}_m];$$

$$\overline{X}_j = \frac{1}{N}\sum_{i=1}^{N} X_{ij}; \text{ and}$$

$$S_j^x = \sqrt{\frac{1}{N-1}\sum_{i=1}^{N}(X_{ij} - \overline{X}_j)^2} \text{ and}$$

$$y_{ij} = (y_{ij} - \overline{y}_j)/S_j^y \text{ with}$$

$$\overline{y} = [\overline{y}_1, \overline{y}_2, \ldots, \overline{y}_p];$$

$$\overline{y}_j = \frac{1}{N}\sum_{i=1}^{N} y_{ij}; \text{ and}$$

$$S_j^y = \sqrt{\frac{1}{N-1}\sum_{i=1}^{N}(y_{ij} - \overline{y}_j)^2}$$

Next, the variables E, F, and h are initialized in step 402 by setting $E_0=X$, $F_0=Y$, and h=1. Further, the processing of each latent component h is performed in steps 406–426.

In step 406, one column of Y is used as a starting vector for u such that $u_h = y_j$. Next, in the X block, the value of w' is calculated in step 408 as:

$$w'_h = u'_h E_{h-1}/\|u'_h E_{h-1}\|$$

In step 410, $t_h$ is calculated from $E_{h-1}$ and $w'_h$:

$$t'_h = E_{h-1} w_h$$

Next, in the Y block, $q_h$ is calculated from $F_{h-1}$ and $t_h$ in step 412 as follows:

$$q'_h = t'_h F_{h-1}/\|t'_h F_{h-1}\|$$

In step 414, $u_h$ is updated by the following equation:

$$u_h = F_{h-1} q_h$$

Next, in step 416, the routine checks for convergence by examining whether if the current $t_h$ is equal to the previous $t_h$, within a certain predetermined rounding error. If not, the routine loops back to step 406 to continue the calculations. Alternatively, from step 416, if the current $t_h$ is equal to the previous $t_h$, the routine calculates the X loadings and obtains the orthogonal X block scores in step 418. The score is computed as follows:

$$p'_h = t'_h E_{h-1}/t'_h t_h$$

$p_h$ is then normalized such that:

$$p'_{h\_new} = p_{h\_old} / \|p'_{h\_old}\|;$$

$$t_{h\_new} = t_{h\_old} \|p'_{h\_old}\|;$$

and $$w'_{h\_new} = w'_{h\_old} \|p'_{h\_old}\|$$

where $p_h'$, $q_h'$ and $w_h'$ are the PLS model parameters that are saved for prediction by the run-time model; $t_h$ and $u_h$ are scores that are saved for diagnostic and/or classification purposes.

Next, in step 420, the routine finds the regression coefficient b for the inner relation:

$$b_h = u'_h t_h' / t_h' t_h$$

Further, the routine of FIG. 5 calculates the residuals in step 422. In step 422, for the h component of the X block, the outer relation is computed as:

$$E_h = E_{h-1} - t_h p_h;$$

$E_0 32 X$

Further, in step 422, for the h component of the Y block, the mixed relation is subject to:

$$F_n = F_{h-1} - b_h t_h q'_h;$$

$F_0 = Y$

Next, the h component is incremented in step 424. In step 426, the routine checks to see if all h components, or latent variables, have been computed. If not, the routine loops back to step 406 to continue the computation. Alternatively, from step 426, if all h components have been computed, the routine exits.

In this manner, regression is used to compress the predicted data matrix that contains the value of the predictors for a particular number of samples into a set of latent variable or factor scores. Further, by running a calibration on one set of data (the calibration set), a regression model is made that is later used for prediction on all subsequent samples.

The thus described process of FIG. 9 builds a PLS regression model between the scores t and u via an inner relation $$u_h = b_h t_h + e$$

where $b_h$ is a coefficient which is determined by minimizing the residual e. Under that case, the regression model is $$y' = x'W(P'W)^{-1}BQ'$$

Upon completion of the process shown in FIG. 5, the parameters are stored in a model parameter data file for subsequent utilization.

In addition to the aforementioned, the present invention contemplates that the PLS analyzer further accepts filtered variables which better reflect the maintenance dynamics and derived variables which better represent process internals. Additionally, the present invention also contemplates that the primary analyzer or model 370, 380 or 390 can compute the derivative of the output and then provide the derivative output to an integrator which outputs second predicted variables. In certain applications, the primary analyzer may also accept prior values of the predicted values as inputs, or prior errors between the predicted target outputs as additional inputs.

Attention is now directed to the fuzzy SISOMs 372, 382 and 392. As the fuzzy SISOMs 382 and 392 are structurally identical to the fuzzy SISOM 372, the description of the fuzzy SISOM 372 applies equally to the description of the fuzzy SISOMs 382 and 392.

In the fuzzy SISOM 372, a fuzzy Single Input Single Output Map (FSISOM) maps a latent variable t to a latent variable u where these are the scores previously described. The architecture of the fuzzy component of the PLS analyzer operates on a number of parameters, namely nBins which is the number of expected value bins or fuzzy membership sets for the universe of discourse on input space and k which is the slope of the fuzzy membership sets.

Figure 10:
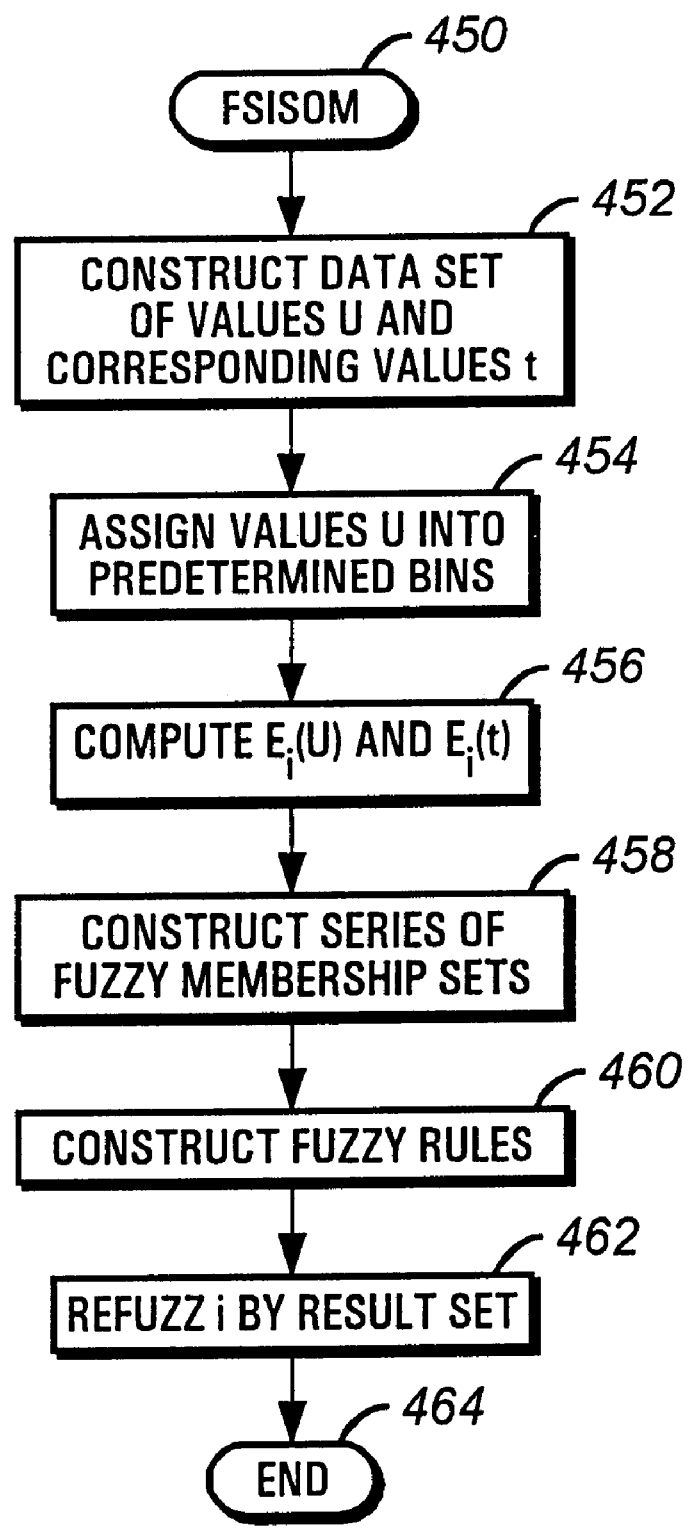
FIG. 10 is a flow chart illustrating the process for creating a fuzzy single input single output model of FIG. 8 in accordance with the present invention.

Referring now to FIG. 10, upon entry to the fuzzy SISOM analyzer or model 372 in step 450, a data set of values of t and corresponding values of u is constructed. This may consist of a file, an array of values in memory, or may be constructed on the fly on an item by item basis as required. For purposes of this description, a data set in memory is assumed. As a variant, rather than using the values of t and u, the residual value of u is used after applying the scaling parameter b to t in the PLS algorithm is computed per step 420.

The following technique can be used to estimate the relationship between t and u directly, or the relationship: t and u−b*t (the residual). If it is used to model the residuals, the output of the Fuzzy SISOM is added to the linear estimate, b*t from step 420. Modeling the residuals has certain advantages when extrapolating beyond the range of data on which the model was developed.

From step 452, the routine of FIG. 10 proceeds to step 454 where the range of t (by construction of the PLS [−1 . . . +1]) is divided into a fixed number of bins "nBins". Each bin is the same width. For example, if nBins is 20, each bin has a width of 0.1 spacing ([0.9 . . . −0.9], [−0.9 . . . −0.8], . . . ,[0.8 . . . 0.9], [0.9 . . . 1.0]). Each example in the data set is assigned to a specific bin based on its t value. Within each bin i, the expected (average) value of t, $E_i(t)$, and u, $E_i(u)$, are computed. This is done by independently summing the values of t and u in each bin and then dividing the suns by the number of examples in the corresponding bin.

From step 454, the routine of FIG. 10 proceeds to step 456 where a series of fuzzy membership sets are constructed for each bin which contains at least one data example. The form of the triangular fuzzy membership set is:

$$DOM_i(t) = \max(0, 1 - k^* |t - E_i(t)|)$$

where $DOM_i(t)$ is the Degree of Membership of t in the fuzzy set i.

k=slope of the fuzzy membership set (also used for smoothing);

t=the point at which to evaluate the fuzzy set;

$E_i(t)$=Expected value of t in bin i; and $|t-E_i(t)|$=absolute value of the difference between t and $E_i(t)$.

In the preferred embodiment, the parameter k is a user supplied parameter which is related to the amount of smoothing of the surface, or it may be estimated as later described. Preferably, k is the slope of the sides of a triangular fuzzy membership function with typical values ranging from 0.5, for substantial smoothing, to nBins/2, for a linear interpolation between centers when all bins have data.

From step 456, the routine of FIG. 10 constructs fuzzy rules in step 460. The rules preferably take the form:

IF t is $E_i(t)$ THEN u is $E_i(u)$.

where the antecedent "t is $E_i(t)$" evaluates to $DOM_i(t)$. This value is multiplied by the result set, in this case a point set $E_i(u)$ and added into the result set u.

Finally, from step 460, the result set is defuzzified in step 462 by dividing the weighted sum by the contribution of all of the input sets before the routine of FIG. 10 completes in step 464. The computation of u, including the evaluation of all of the rules and final defuzzification is generated as follows:

$$U(t) = \frac{\sum_{i=1}^{nBins} E_i(u)DOM_i(t)}{\sum_{i=1}^{nBins} DOM_i(t)}$$

In this instance, triangular fuzzy membership sets are preferred. The present invention also contemplates that other membership sets which have a single point at which the degree of membership is 1.0, and are monotonically decreasing to the right and left of that value may be used. For example, a Gaussian kernel, or non-symmetric triangular membership sets may be used.

If the membership sets are replaced with a Gaussian kernel ($e^{-k*(t-E_i(t))^2}$), the result is a kernel density estimator using a specially derived sub-set of data computed for each bin. This is mathematically equivalent to a Generalized Regression Neural Network (GRNN). The basic idea of nonparametric density estimation is to relax the parametric assumptions about the data, typically replacing these assumptions with ones about the smoothness of the density. The most common and familiar nonparametric estimator is the histogram. Here the assumption is that the density is fairly smooth (as determined by the bin widths) and an estimate is made by binning the data and displaying the proportion of points in each bin (producing a necessarily non-differentiable, but still useful estimate). This is used to weight the expected value of the outcome.

The kernel density estimator, studied widely since its introduction in 1962, is related to the histogram, but produces a smooth (differentiable) estimate of the density. When used for regression, the pointwise estimator of the density is multiplied by the normalized density. Here, the data $x_1, \ldots, x_n$ is drawn from the unknown density f the standard kernel estimator (SKE), or a single bandwidth estimator:

$$f(x) = \frac{1}{nh}\sum_{i=1}^{n} K\left(\frac{X-X_i}{h}\right)$$

In the above equation, the bandwidth h determines the smoothness of the estimator. However, it is better if a small number of bandwidths are used rather than a single one to Lo allow for a local tuning of the density. Thus, if the density consists of a mixture of two normals with different variances which are very far apart such as:

$$\alpha(x) = p\phi(x_1 - \mu_1 \sigma^2_1) + (1-p)\phi(x_1 \mu_1 \sigma^2_2)$$

An estimate of the two components separately applies $$\rho_1(x) = \chi_{\{\lambda > 0\}}(x)$$

$$\rho_2(x) = \chi_{\{\lambda \leq 0\}}(x)$$

and define an estimator as:

$$\alpha(x) = \frac{1}{n}\sum_{i=1}^{n}\left(\frac{\rho_1(x_i)}{h_1} K\left(\frac{x-x_i}{h_1}\right) + \frac{\rho_2(x_i)}{h_2} K\left(\frac{x-x_i}{h_2}\right)\right)$$

The above definition allows us to use bandwidths appropriate to the different components in the different regions where they are supported. However, using the above equations, when two components are moved closer together, the overlapping region becomes more and more significant.

The process of FIG. 10 has the advantage that the fuzzy membership sets are constructed around expected, or average values for each u or the residuals u−b*t. The values for the linear coefficients in the PLS are dependent on the distribution of the data (minimizing the sum of the squares is a data distribution dependent computation). However, construction of the fuzzy membership sets is data distribution independent, since the expected value for u is being computed, regardless of how many examples occur in a particular bin. This means that models constructed with this technique begin to approximate the L-infinity norm (minimizing the maximum absolute error) rather than regression techniques, which may be skewed by data concentrated in certain portions of the input space.

Figure 11:
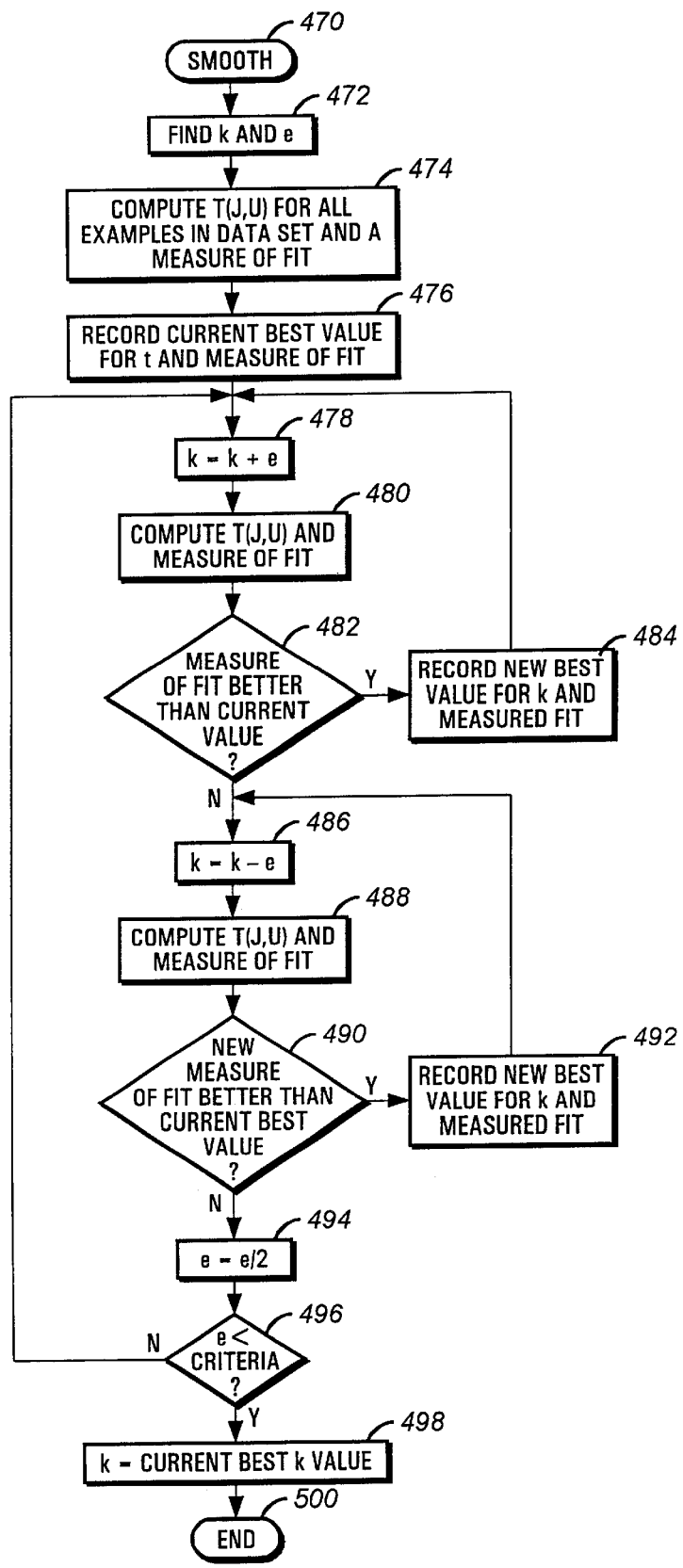
FIG. 11 is a flow chart illustrating the process for estimating the value of the smoothing parameter k of FIG. 10 in accordance with the present invention.

Turning now to FIG. 11, the flow chart for generating the smoothing criteria k is shown. The smoothing criteria k is user selectable or is preferably determined heuristically by applying a cross validation procedure of FIG. 11. From step 470, the smoothing criteria determining routine of FIG. 11 selects a nominal value of k in step 472. This is typically in a range expected to be "good" by the user. A nominal delta $\epsilon$ is also selected in step 472. A typical value for k is nBins/4, while a typical value for $\epsilon$ E is k/8.

From step 472, the routine of FIG. 11 computes $U^*(j,t)$ and a measure of fit for all examples in the data set in step 474. The measure of fit, preferably a sum squared error ($\Sigma(U^*(j,t)-u)^2$) or a sum of absolute errors, is computed over all iterations of j and all pairs of values t and u, to provide a measure of the effectiveness of the model when one of the bins is removed.

$$U^*(j,t) = \frac{\sum_{i=1, i\neq j}^{nBins} E_i(u)DOM_i(t)}{\sum_{i=1}^{nBins} DOM_i(t)}$$

From step 474, the routine proceeds to step 476 where the current best value for k and measure of fit is recorded. Next, in step 478, the value for smoothing, k, is set to the current best value of k plus $\epsilon$. The computation for $U^*(j,u)$ and the measure of fit, similar to that performed in step 474, is repeated in step 480. In step 482, if the measure of fit is better than the current best value, the current best value of k and associated measure of fit is recorded in step 484 before the routine loops back to step 478 to repeat the iterations.

Alternatively, if the measure of fit is worse than the current best value in step 482, the routine of FIG. 11 proceeds to step 486 where the value for k is set to the current best value of k minus $\epsilon$. If this difference is less than or equal to zero, proceed immediately to step 494. The computation for $U^*(j,t)$ and the measure of fit, similar to that performed in step 474, is repeated in step 488. In step 490, if the measure of fit is better than the current best value, the current best value of k and associated measure of fit is recorded in step 492 before the routine loops back to step 486.

Once the evaluation in step 490 is false, the routine of FIG. 11 proceeds to step 494 where the value of ε is reduced by one half. If it is less than a predetermined stopping criteria, for example, 0.05, the value of k is set to the current best value in step 498 before the process of FIG. 11 terminates in step 500. Otherwise, the routine of FIG. 11 loops back to step 478 to repeat the entire process.

Alternatively, the present invention contemplates the application of a genetic algorithm, as known to those skilled in the art, to "intelligently" search for a value of k.

An enhancement to the fuzzy SISOM, which improves run-time computational speed and facilitates the rapid computation of derivatives (required under certain circumstances), is to divide each bin into several "sub-bins". For instance, if 20 bins initially existed, and each bin has 10 sub-bins, a total of 200 sub-bins is available. In this case, the fuzzy SISOM is evaluated at each end-point for each sub-bin. A linear approximation of the surface within the sub-bin is computed as a scale and offset from the start of the sub-bin. These are combined together to provide a piecewise-linear estimate of the complete fuzzy SISOM. The computations are as follows:

$$m_i = \frac{U\left(\frac{2i}{nSub} - 1\right) - U\left(\frac{2(i-1)}{nSub} - 1\right)}{\frac{2}{nSub}}$$

$$b_i = U\left(\frac{2i}{nSub} - 1\right) - m_i \cdot \left(\frac{2i}{nSub} - 1\right)$$

where $U(x)$=the result of evaluating the fuzzy SISOM at x;

nSub=the total number of sub-bins to cover the range [−1 . . . +1];

i=the ith bin, i=1 . . . nSub;

$m_i$=the slope for the ith sub-bin; and $b_i$32 the offset for the ith sub-bin.

With the above computed slope and offset, the output of the fuzzy SISOM is estimated at any point by determining the bin (i) to which t belongs and then computing $U_{est}(t) = m_i * t + b_i$.

The bin to which t belongs can be determined by any number of means. One method is to compare the value of t to the upper and lower limits for each bin, and pick the one in which t is greater than or equal to the lower limit, and less than the upper limit. Another method is to use the formula INT(0.5*(t+1)*nSub )+1 which truncates and maps a value of t between [−1 . . . +1] into the range [1 . . . nSub]. Another enhancement is to compute the trend independently at each end of the fuzzy SISOM and use this to compute a scale and offset at each end of the fuzzy SISOM for linearly extrapolating beyond the ends of the range [−1 . . . +1].

Although fuzzy SISOMs described in FIGS. 8 and 10 are preferred, the present invention contemplates that conventional multi-layer, feedforward neural networks, as described in the incorporated by reference U.S. application Ser. No. 08/642,775, may be used in place of the fuzzy PLS. Further, though the fuzzy PLS analyzer of FIGS. 8 and 10 is shown in conjunction with the plasma etch modeling process, the fuzzy PLS is broadly applicable to a number of applications. In particular, it can be used to replace the non-linear error correction model disclosed in the incorporated patent application entitled "HYBRID LINEAR-NEURAL NETWORK PROCESS CONTROL", as well as in U.S. Pat. No. 5,477,444, entitled "CONTROL SYSTEM USING AN ADAPTIVE NEURAL NETWORK FOR TARGET AND PATH OPTIMIZATION FOR A MULTIVARIABLE, NONLINEAR PROCESS," hereby incorporated by reference. The disclosed fuzz PLS is also applicable to solving problems in modeling financial time series, and as a replacement for linear and non-linear regression techniques.

Figure 12:
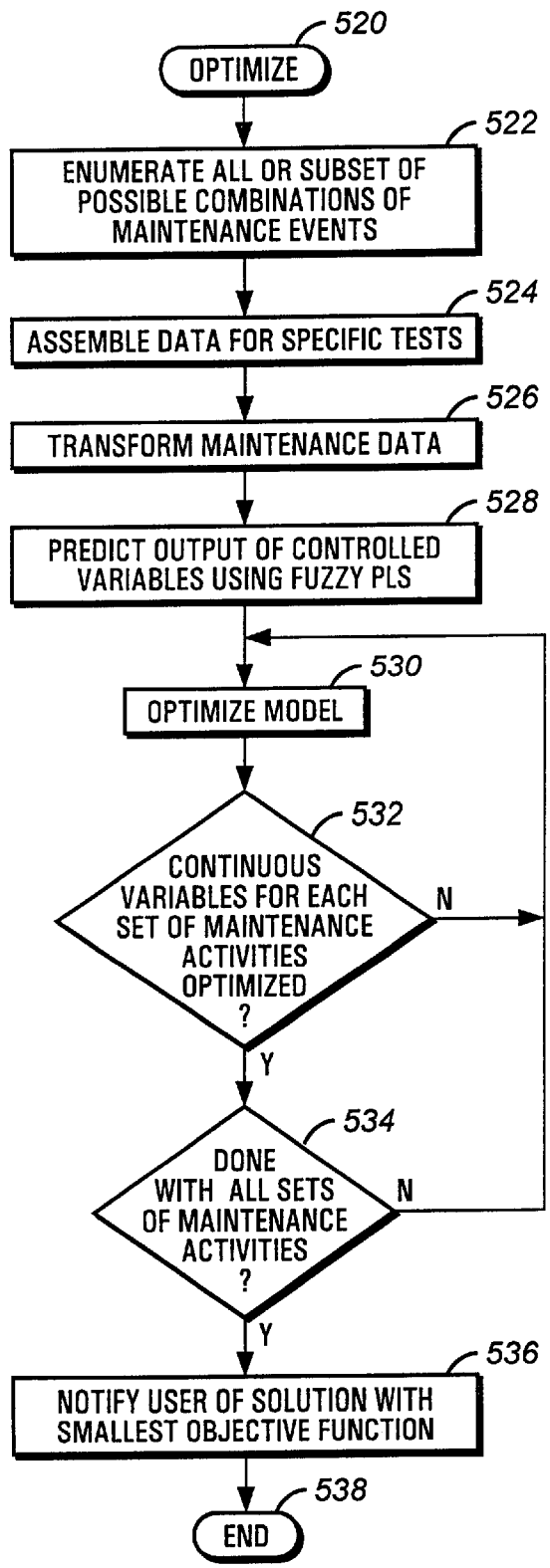
FIG. 12 is a flow chart illustrating the process for optimizing the analyzer or model of FIG. 8 in accordance with the present invention.

Turning now to FIG. 12, an optimization process is shown. The optimization process improves the performance of the analyzer of the present invention. One of the challenges with optimizing this particular model is that the maintenance events are discrete. Preferably, a hybrid approach is used where an objective function is defined in which each maintenance activity, each control move, and each deviation of the controlled variables from their optimum values are assigned cost functions. The objective is the minimization of the maximum of all cost functions. The process is accomplished by performing predefined maintenance activities and optimizing these activities.

Each manipulated and controlled variable is assigned its own cost function. For continuous manipulated and controlled variables, the cost function has a minimum at the nominal resting point which increase therefrom. For maintenance events, the cost function is a decreasing function of time since the last event. Repeating a maintenance event immediately after a prior event is considered very expensive. Disturbance variables are ignored in the objective function. For each manipulated, controlled, and replaced variable, the cost associated with the current state is evaluated. If a maintenance item is not replaced, its cost is zero. The maximum of all costs is the value of the objective function. Preferably, the optimization process divides the problem into two parts: discrete maintenance event performance and a process variable optimization.

Turning now to FIG. 12, an optimizer 520 is disclosed. In step 522 of FIG. 12, the routine enumerates all or a sub-set of the possible combinations of maintenance events. A sub-set may be defined by the user, or process engineer, to reduce the search space and to accelerate the search process. The set consisting of no maintenance events is always one of the enumerations.

Next, in step 524, for each specific test run on the plasma etch equipment P, data is assembled, including: the values for each of the continuous parameters on the machine, the time, in RF minutes, since the last maintenance event of each type, and the measured values of the process outputs, selectivity, average etch rate, standard deviation of etch rate, among others. Further, in step 526, maintenance inputs are transformed using the filters previously described. Derived variables, if any, are evaluated.

In step 528, the Fuzzy PLS of FIG. 8 predicts the outputs of each of the controlled variables, or the process outputs. An offset is computed for each output that reconciles the model estimate to the observed value. This is analogous to the error tracking mechanism or correction factor in the NeuCOP controller disclosed in the incorporated by reference U.S. Pat. No. 5,477,444.

From step 528, the routine of FIG. 12 optimizes the model using continuous manipulated variables in step 530. This is accomplished by using a technique called Dynamic Hill Climbing (DHC). This is a directed search process which explores the solutions around the current point in ever decreasing circles. When a new "better" solution is found, this becomes the new current point, and the process proceeds. During this phase of the optimization process, disturbance variables and filtered maintenance values are treated as constant inputs to the model. Only those variables which the process engineer has designated as changeable are changed. Other techniques such as Sequential Quadratic Programming (SQP), genetic algorithms, or Monte Carlo can be used in place of the DHC algorithm. Maintenance events, the resulting changes to manipulated variables, and the performance index, or objective function, are added to a table sorted by increasing values of the objective function. For purposes of computing the cost function associated with continuous variables, maintenance effects are ignored. Preferably, in step 528, if at any point during the heuristic search the cost function associated with the continuous variables drops below that of the current replacement events, the optimization is aborted. The activation of this feature is a user-controlled option during the optimization process.

From step 530, the routine of FIG. 12 checks each set of maintenance activities in step 532. Further, the filters for those events which are specified are set to 1, designating an immediate replacement. The costs associated with maintenance events are the cost computed from the time since the last event. Costs for maintenance events which are not implemented are set to zero. Step 530 is repeated to optimize the continuous variables. The objective function is the maximum of the costs for the maintenance events implemented, and the current values of the continuous input variables and the output variables. Preferably, for a specific instance of input data, the cost functions for each set of enumerated replacement actions are computed. The actions are sorted into ascending order based on the cost of the replacement actions. This ordered list is used in step 532. As step 532 proceeds through the list, if the cost of replacement is greater than the current best item, the optimization is complete and the routine proceeds to step 534. This is because the cost or fitness associated with a particular set of replacement activities and associated changes to continuous manipulated variables is at least equal to the larger of the costs associated with each. It is not possible to have a lower cost than that associated with the replacement activity. As such, the testing of the example based on its replacement cost can be eliminated. Preferably, the activation of this feature is a user-controlled option during the optimization process.

From step 532, the routine of FIG. 12 checks if it is done with all sets of maintenance activities in step 534. If not, the routine loops back to step 530. Alternatively, if all maintenance activities have been analyzed, the routine transitions to step 536. In step 536, the solution with the smallest objective function is output to the user before the routine of FIG. 12 is terminated in step 538.

Preferably, the data storage is implemented such that they are local and accessible in the same portion of the program to optimize the CPU data cache hit ratio. Additionally, the analyzer extensively uses pointers and syntactic structures which enhance the optimality of the compiled code. These code optimizations are arrived at by examining the assembly code produced by the compiler for time-critical loops and by exploring the effects of changing various functionally equivalent syntactic changes. For example, dot products are frequently computed and thus the dot product routine is optimized to execute using only 11 instructions for the dot product operation, as shown by the following code:

```
;void vDotv (double *dpR, double *dp1, double *dp2, int n)
;
 _vDot2:
        push    EBP
        mov     EBP, ESP
        push    EBX
        push    ESI
        mov     ECX, 8 [EBP]
        mov     EDX, 0Ch [EBP]
        mov     EBX, 010h [EBP]
        mov     ESI, 014h [EBP]
        jmp     short L5D
;for (; --n >=0; dpR+ +, dp1+ +, dp2+ +)
;       *dpR = *dp1 * * dp2;
 L4A:   fnld    qword ptr [EDX]
        fnld    qword ptr [EBX]
        fnmulp  ST (1), ST
        fnstp   qword ptr [ECX]
        mov     EAX, 8
        add     ECX, EAX
        add     EDX, EAX
        add     EBX, EAX
 L5D:   dec     ESI
        test    ESI, ESI
        jns     L4A
;       pop     ESI
        pop     EBX
        pop     EBP
        ret
```

In the above example, the core loop in the code is optimized at 11 instructions, as opposed to other versions which require 13 instructions or more. Although only a net saving of two instructions is achieved, because the dot product routine is repetitively executed, the saving of two instructions per dot product operation results in increased overall speed. The code as discussed above is generated by a Symantec C compiler version 7.22 for an Intel 80486 or compatible processor operating in 32-bit mode with in-line floating point code. Additionally, functions are expanded in-line using macros to further reduce the overhead associated with subroutine or function calls.

The thus disclosed invention provides the first model or first analyzer having a series of filters to represent time-varying effects of maintenance events. The first model or analyzer enhances the selection of derived variables which are used as inputs to the first analyzer. Additionally, a combination of fuzzy logic and statistical regression analyzers, including fuzzy PLS analyzers, are provided to better model the equipment maintenance process. The optimizer of the present invention then integrates discrete maintenance events with continuous process variables. The optimizer determines the time and the type of maintenance activities to be executed, as well as the extent to which the maintenance activities can be postponed by changing other process variables. Thus, the present invention also determines potential modifications to process variables to improve the current performance of the processing equipment as it drifts out of tolerance.

In addition to the fuzzy PLS analyzer or model discussed above, the present invention contemplates that other models or analyzers could be used instead, including PLS only analyzers, neural network analyzers, including the linear-neural network hybrid of the incorporated by reference U.S. patent application Ser. No. 08/642,775, and kernel estimators, polynomial analyzers, including group method of data handling (GMDH) polynomial analyzers, among others.

It is to be understood that the description of data to be collected such as the RF generator calibration value, clamp replacement value, RF power, and gas flow rates associated with the operations of the semiconductor plant is representative and has only been provided as examples of the types of variables to be collected. Further, the present invention contemplates that the number of manipulated, disturbance and controlled variables, optimization goals and variable limits can be changed to suit the particular process of interest.

The techniques and processes according to the present invention can be utilized in a wide range of technological arts, such as in many other process control environments, particularly multi-variable and more particularly non-linear environments present in a number of plants such as oil refineries, chemical plants, power plants and industrial manufacturing plants, among others. Further, the present invention can be used to improve the analyzer or model for a number of areas, particularly in forecasting prices, change in price, business time series, financial modeling, target marketing, biological and medical processes, and various signal processing applications such as speech recognition, image recognition and handwriting recognition. Thus, the present invention is not limited to the description of specific variables collected in the illustrative semiconductor plasma etching environment.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method for modeling a task having input parameters and one or more activities, said method comprising the steps of:

collecting said input parameters;

generating derived variables, including the steps of:

performing a search on said input parameters using one of more functional forms;

correlating said functional forms to the results of the performed search; and ranking said functional forms based on the results of the step of correlating; and applying a primary analyzer to said input parameters and said derived variables to generate outputs corresponding to said activities.

2. The method of claim 1, wherein said collecting step further comprises the steps of receiving and modifying time-varying input parameters.

3. The method of claim 2, wherein said modifying step filters said time-varying input parameters.

4. The method of claim 2, wherein said collecting step collects operating periods between said activities.

5. The method of claim 1, wherein said collecting step includes transforming the input parameters into representations of events occurring in the task.

6. The method of claim 1, wherein said collecting step filters said input parameters.

7. The method of claim 1, wherein said correlating step comprises the step of applying a uniformly distributed sub-set of examples of said input parameters.

8. The method of claim 1, wherein said applying step applies a partial least squares analyzer having a linear inner model.

9. The method of claim 1, wherein said applying step applies a partial least squares analyzer having a fuzzy single-input-single-output (FSISO) model.

10. The method of claim 1, wherein said applying step applies a partial least squares analyzer having a kernel density estimator.

11. The method of claim 1, wherein said applying step applies a partial least squares analyzer having a generalized regression neural network.

12. The method of claim 1, further comprising the step of optimizing said analyzer.

13. The method of claim 12, wherein said input parameters include continuous variables and wherein said optimizing step further comprises the step of integrating discrete events representative of said activities with said continuous variables.

14. The method of claim 12, wherein said optimizing step further comprises the steps of:

generating all combinations of said discrete activities into enumerated sets; and deriving a common objective function for each of said enumerated sets, including the steps of:

evaluating the cost of said set of discrete activities;

optimizing said continuous activities based on said cost; and merging the results of said evaluating step and said continuous activities optimizing step into said common objective function.

* * * * *